United States Patent [19]
Valentine

[11] 3,986,278
[45] Oct. 19, 1976

[54] EDUCATIONAL DEVICE FOR LEARNING TRANSMISSION DRIVE SHAFT, AND AXLE OPERATION

[75] Inventor: Charles G. Valentine, Stamford, Conn.

[73] Assignee: Xerox Corporation, Stamford, Conn.

[22] Filed: Oct. 4, 1974

[21] Appl. No.: 512,793

Related U.S. Application Data

[63] Continuation of Ser. No. 345,949, March 29, 1973, abandoned.

[52] U.S. Cl. .................................. 35/13; 35/7 A; 40/142 A
[51] Int. Cl.² ..................................... G09B 25/02
[58] Field of Search ............. 35/7 A, 8 R, 8 A, 9 R, 35/9 A, 10, 13, 19 R, 19 A, 48 R, 49–53; 40/142 A

[56] References Cited
UNITED STATES PATENTS

| | | | |
|---|---|---|---|
| 2,996,802 | 8/1961 | De Mase et al. ........................... | 33/1 |
| 3,077,696 | 2/1963 | Barnett et al. .................. | 35/19 A X |
| 3,245,156 | 4/1966 | De Bloois et al. ..................... | 35/8 X |
| 3,423,846 | 1/1969 | Arend ................. | 35/19 A |
| 3,514,873 | 6/1970 | Stobbe .............................. | 35/7 A X |
| 3,520,074 | 7/1970 | Severin et al. ....................... | 35/48 R |
| 3,538,626 | 11/1970 | Frank ................................. | 35/48 R |
| 3,651,592 | 3/1972 | McCormick et al. ............. | 40/142 A |

OTHER PUBLICATIONS

Rosengren, H. J.; *Three Dimensional Teaching Aids for Trade and Industrial Instruction*; Dept. of H.E.W.; 1961; p. 9.
*The Way Things Work*; Simon and Schuster, N.Y.; 1967; pp. 494–499.

*Primary Examiner*—Richard C. Pinkham
*Assistant Examiner*—Vance Y. Hum

[57] ABSTRACT

An educational kit for teaching the operation of an automobile transmission is disclosed. The kit comprises audiovisual instructional equipment, a simulator board upon which is graphically depicted a schematic sectional view of an automobile transmission, and a plurality of manipulative pieces upon which are graphically depicted various of the major parts which constitute the internal mechanism of the transmission. The pieces are adapted for manipulation on the simulator board whereby the user of the kit may construct relationships and define concepts involved in the system under study in response to the instructional equipment.

5 Claims, 7 Drawing Figures

AUDIO VISUAL MEANS

WORK SHEETS

EDUCATIONAL DEVICE FOR LEARNING TRANSMISSION DRIVE SHAFT, AND AXLE OPERATION

This is a continuation of application Ser. No. 345,949 filed Mar. 29, 1973, now abandoned.

BACKGROUND OF THE INVENTION

The present invention relates to an educational kit designed for training in automotive technology. More specifically, the invention deals with an educational learning kit designed to help students of automotive technology understand the assembly, relationship of parts and operation of an automobile transmission.

The automobile is a fairly complex piece of machinery constructed from many complex subsystems. When these subsystems are operating properly and cooperating with one another as they should, a pleasurable drive in the country is there but for the taking. However, when one or more of these subsystems malfunctions, a pleasurable drive in the country often becomes both a regrettable experience for the automobile owner and a delight to the automobile repairman.

Traditionally, an individual interested in automobile technology might avail himself of the opportunity to acquire the skills necessary for the occupation of automobile mechanic or repairman by any one of a number of routes. Often, such skills are acquired by attending trade schools, by taking courses in automotive technology, through military service training, by simple on-the-job training, or by self-training. Regardless of the route taken, the first goal which should be achieved is an understanding of the automobile and its component subsystems, and how each of these subsystems cooperate with one another to achieve a desired result. A second goal is an understanding of specific subsystems, including how they operate, what parts make up the subsystems, how these parts are assembled and how these parts relate to one another. Once these goals have been achieved, the individual is better equipped for training in diagnosis and repair of the various malfunctions occurring in automobile subsystems.

At some point during the learning process, it is most desirable that the student of automobile repair extend beyond charts, manuals or diagrams and be afforded the opportunity to see, examine and manipulate the actual subsystem under study or a model thereof. Physical exposure to the subsystem and its component parts aids the student in better understanding what he hears or reads about it, and complements the learning process by permitting him to inspect, manipulate and arrange the various parts.

Recent years have marked the introduction of a number of educational teaching devices generally aimed at the precollege or pre-high school age group. The most common of these are the mechanical or computer devices designed to be used by individual students. The theory behind the increasing use of such devices is that account is made of the individual differences in ability, speed and grasp of subject matter thereby permitting the student to learn at his own pace with minimum supervision by the teacher. Some of these devices also introduce new dimensions into the learning process wherein, for example, spelling may be associated with pictures of objects, mathematical concepts associated with the relative sizes and shapes of objects, or correct responses to questions posed by a computer rewarded by permission to proceed.

The advantages of a teaching method using a device geared for the individual should not be considered restricted to elementary school subjects; occupational learning materials that take into account individual differences in ability, speed and grasp of subject matter also have a better chance of being effective. However, at the present time there are very few educational devices available to the Community Colleges, Vocational High Schools and other special schools where various types of mechanical and electrical technologies are sought to be taught on a simplified and individualized basis. There is a great need for occupational learning devices which can be used by the individual student while learning a particular technology and which permit the student to physically simulate the construction or arrangement of parts or concepts involved in the particular systems or subsystems under study prior to examination of the actual system or subsystem.

Accordingly, it is an object of this invention to provide a novel approach toward the learning of automobile systems and subsystems.

Another object is to provide an educational kit comprising instructional means and simulator means for teaching the internal mechanism of an automobile transmission.

Another object is to provide an occupational educational kit which is simple, relatively inexpensive, rugged, easily assembled, relatively portable and easily understood.

Another object is to provide an educational kit designed for use by individual students comprising audio, visual or audiovisual instructional means, a simulator board, and pieces representative of the internal parts of an automobile transmission, whereby the student may manipulate the pieces on the simulator board in response to said instructional means to graphically depict the assembly, relationship of parts and operation of an automobile transmission.

SUMMARY OF THE INVENTION

In accordance with the teachings of the present invention, a simple and effective educational kit for the teaching of the assembly, relationship of parts and operation of an automobile transmission is provided. The kit comprises an instructional means, a simulator board upon which is graphically depicted a schematic sectional view of an automobile transmission, and a plurality of pieces upon which are graphically depicted various of the major parts which constitute the internal mechanism of the transmission. The kit may also comprise a display board which provides for storage and easy access to the various pieces when the unit is in use. The kit is designed to present the fundamentals of the function and mechanism of an automobile transmission using a programmed, multimedia approach whereby the student hears and sees information, performs by answering questions, solving problems and manipulating objects. The kit is designed for individual use or use by small groups without the need for extensive supervision or participation by an instructor. It permits the student to learn at his own pace, and also affords him the chance to capitalize on the way he learns best because he participates in different kinds of learning experiences. He listens to information while viewing a series of related visuals and participates in a manipulative activity which gives him a chance to try doing himself what he has been shown or told how to do. He is thus totally involved in the learning process.

DETAILED DESCRIPTION OF THE INVENTION

The preferred instructional means employed in the kit is an audiovisual presentation using slides or filmstrips in conjunction with a descriptive audio account of the visuals. The visual materials are synchronized with the audio presentation. A recorded narrator provides background information descriptive of the various components of the automobile drive system such as the engine, the clutch, the transmission, the differential and the like, with particular emphasis on the transmission, what its function is, how it operates, the component parts thereof and how these parts are assembled. During this audio presentation, a series of synchronized related visuals are shown to the students. These visuals comprise photographs or diagrams of the various components of the drive system and the gears, shafts and clutch mechanisms constituting the internal mechanism of the transmission.

The audiovisual equipment needed will vary depending on the type of instruction to be given. A rear screen projector for small groups, or a projector and screen for a classroom presentation may be used. For the audio presentation, tape recordings using either visual projection equipment with built-in audio capability or a separate cassette recorder may be used. The instructional means provided with the educational kit includes a visual segment available, for example, on 35 mm slides or filmstrips, and an audio segment available on cassettes. The supporting equipment is normally not included.

At various points during the presentation the student is requested to stop the audiovisual presentation and perform certain activities using the simulator board and pieces associated therewith. He may be requested to assemble a series of pieces bearing graphic indicia representative of gears or shafts in accordance with a pictured diagram or to manipulate and arrange the various pieces to represent gear positions simulating the automobile transmission when in neutral, first, second, third or reverse gear. The simulator activity allows a student to actually use his hands as a learning tool as well as his eyes and ears. By performing an activity using the simulator board and its accessories, the student takes an active part in the learning process and achieves understanding more quickly.

The simulator board and the accessories are best described with reference to the attached drawings.

DETAILED DESCRIPTION OF THE DRAWINGS

Figure 1:
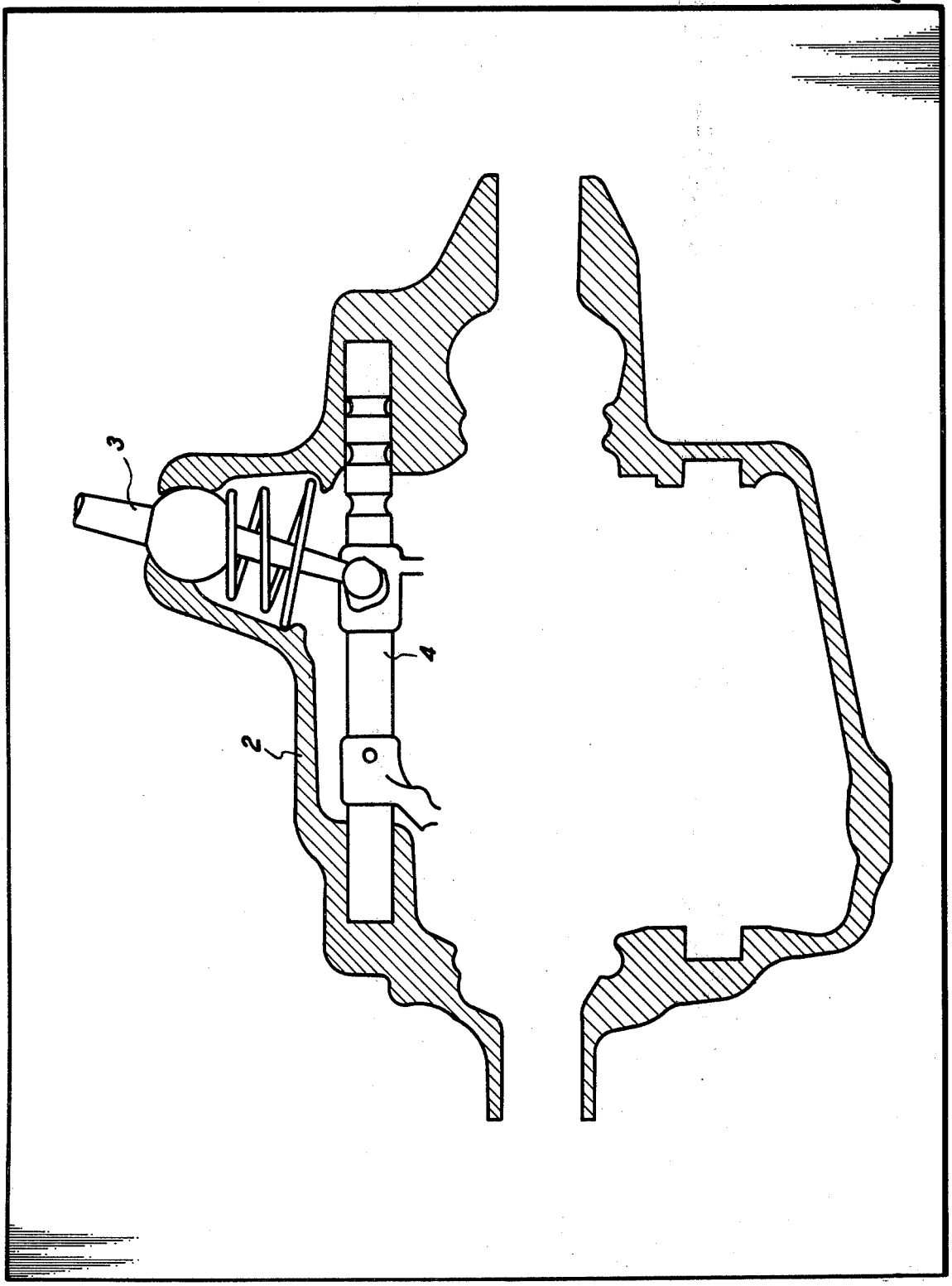
FIG. 1 is a plan view of the simulator board with graphic indicia thereon.

In FIG. 1, the simulator board 1 is shown having printed thereon graphic indicia 2 representative of a schematic sectional view of an automobile transmission housing. Also shown are graphic indicia representative of the gear shift 3 and linkage 4 which serves to simulate the connection between the gear shift and the internal mechanism of the transmission.

The simulator board may be constructed of a magnetically attractive sheet of rigid material such as ferrous metal or a magnetic ferrite plastic, or a thin sheet of ferrous metal coated with a thin layer of plastic material. The surface of the board is painted with a neutral background color such as a white or yellow enamel. The graphic indicia present on the board may be printed over the enamel in a suitably contrasting color such as black. Printing may be accomplished by any suitable means such as, for example, a silk screening process. Although the simulator board may consist solely of a thin sheet of metal with suitably smooth edges, the metallic sheet is preferably laminated to a suitable backing member which imparts suitable rigidity thereto. Thus, in the preferred embodiment the simulator board comprises a thin sheet comprising ferrous metal having a thickness of about 1/32 inch laminated to a backing member made from a rigid material such as fiberboard, or a resinous material, said backing material having a preferred thickness of about ¼ inch. The dimensions of the simulator board should be such that the board can be conveniently used by the student at a given workplace. Boards having dimensions of about 15 × 20 inches, or approximately 300 square inches, are particularly suitable.

Figure 2:
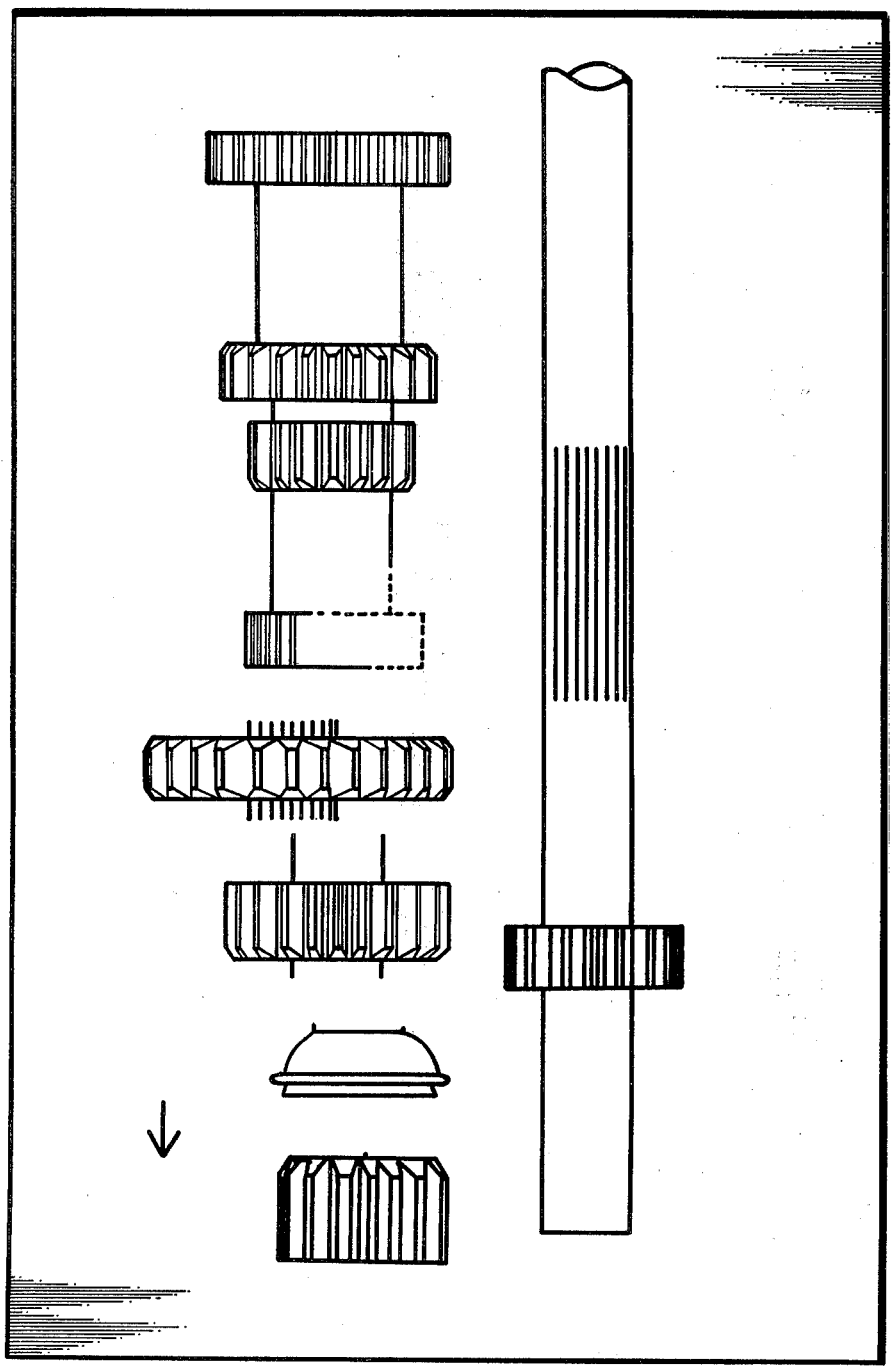
FIG. 2 is a plan view of the display board with graphic indicia thereon.

In FIG. 2 a display board 5 is shown having printed thereon graphic indicia representative of the various gears, gears and shafts and internal clutch mechanism of an automobile transmission. The display board is also constructed on a magnetically attractive rigid material similar to the simulator board and the background and indicia may be printed thereon in the same way. The purpose of the display board is to serve as a display and storage area for the magnetically attractive pieces which are used in conjunction with the simulator board. Each of the spaced graphic indicia printed on the display board corresponds to the indicia printed on one of the pieces thereby facilitating systematic storage and display of the pieces and allowing for quick inspection to determine that all of the pieces are accounted for. The edges of the board should be either smooth or rolled over to prevent injury from sharp edges.

Figure 3:
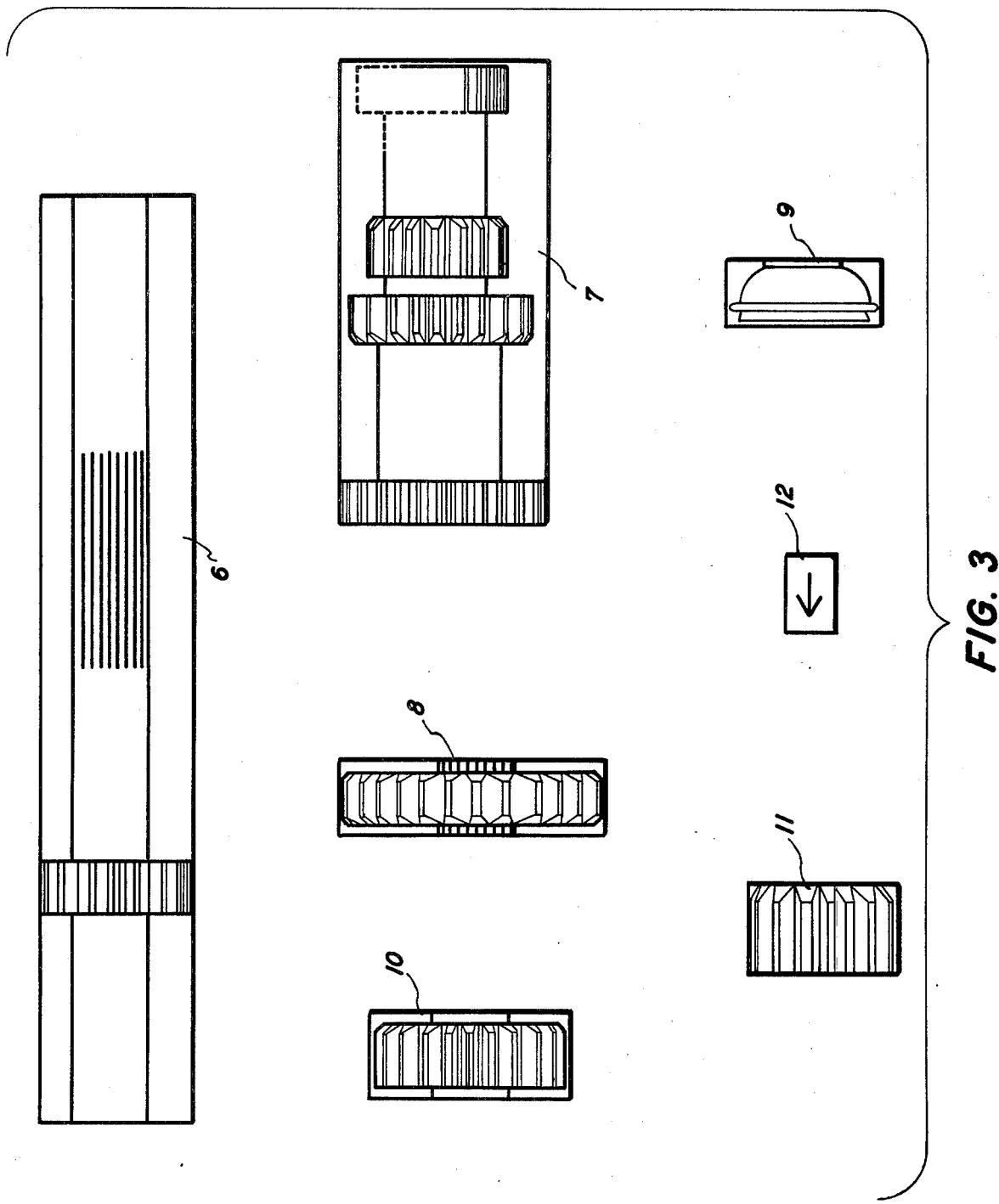
FIG. 3 is a plan view of the manipulative pieces having graphic indicia thereon representative of the various mechanisms present in an automobile transmission.

The manipulative pieces used in the educational kit are shown in FIG. 3. Each of these pieces consists of a flat sheet of rigid material such as metal or plastic upon which is printed one of several indicia representative of the various gears, shafts and gears or internal clutch mechanisms of the automobile transmission. In the preferred embodiment, the pieces are made of a plastic material such as polyvinylchloride having a thickness of about 1/16 inch and having smaller sections of a magnetically attractive material laminated to the underside thereof. The smaller sections also serve to provide a gap between the piece and the surface upon which it is resting to facilitate gripping and manipulation of the piece on flat surfaces. The indicia represented on the various pieces are the main shaft and associated upper main drive gear 6, the countershaft and associated gears 7, the sliding gear 8, the synchronizing clutch 9, the second speed gear 10, and the reverse idler gear 11. Also included is a piece having an arrow thereon which is used to indicate the direction certain gears should rotate to produce a desired effect in terms of motion of the automobile. The size and shape of these pieces is such that they fit and can be manipulated within the confines of the simulator board indicia and at the appropriate location. The relative sizes of the depicted shafts and gears with respect to one another are such that the physics of gear ratio, mechanical advantage and torque can be demonstrated.

Figure 4:
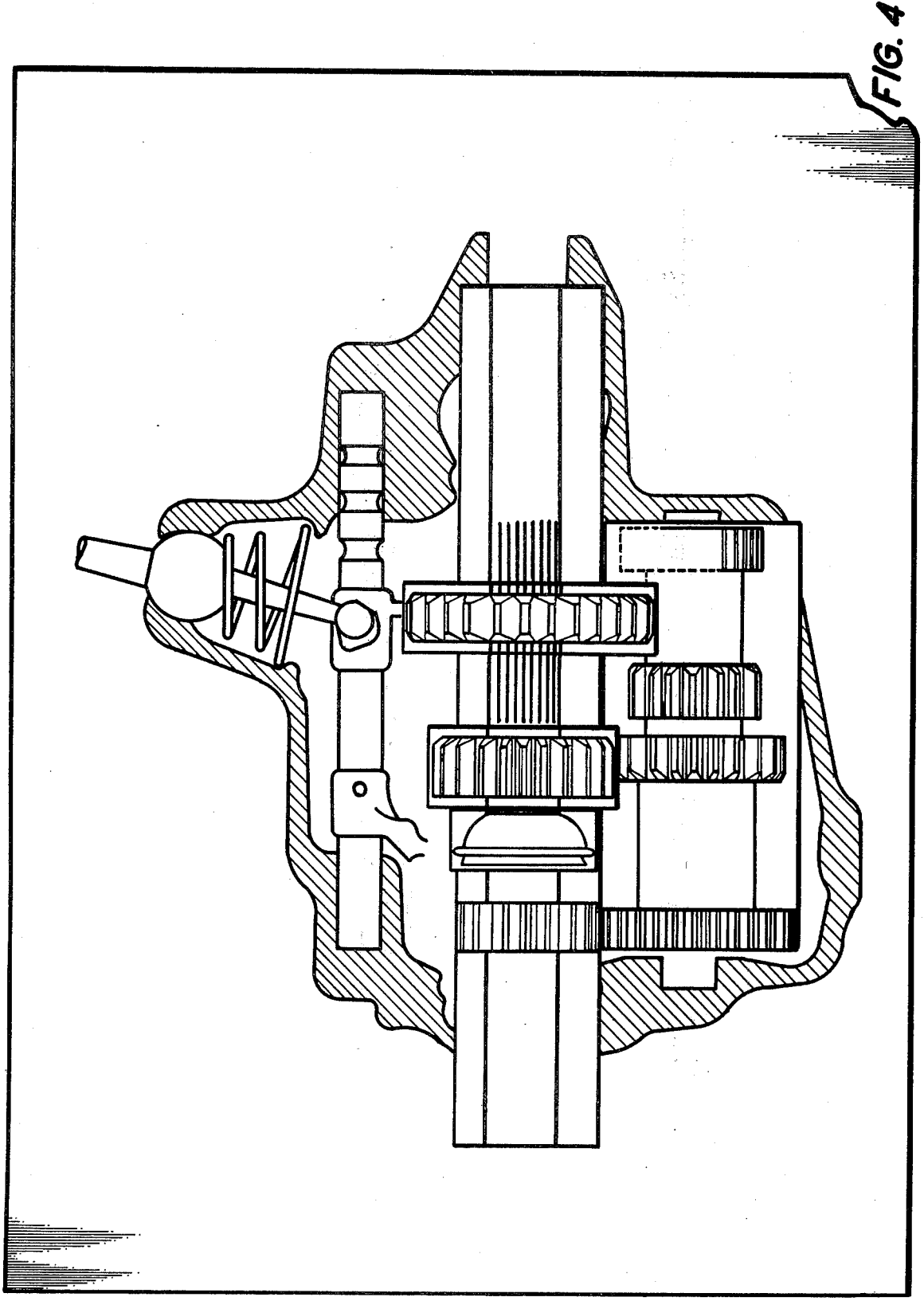
FIG. 4 is a plan view of the simulator board with certain of the manipulative pieces in place.
Figure 5:
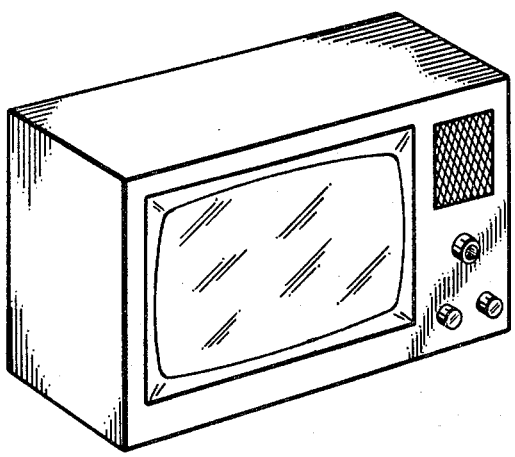
FIG. 5 illustrates generally an audiovisual device suitable for use in the present invention.
Figure 6:
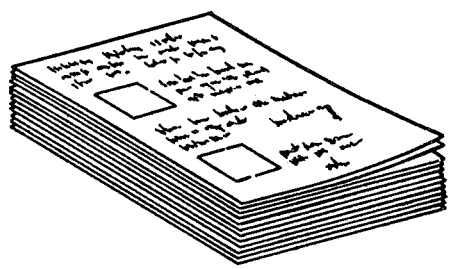
FIG. 6 illustrates generally worksheets in accordance with the present invention.
Figure 7:
FIG. 7 is a side sectional view of a typical manipulative piece in accordance with the invention showing smaller mangetic sections laminated to the underside of the piece.

In FIG. 4 the simulator board 1 is depicted with some of the pieces representing shafts and gears in place. The pieces are placed such that the assembly is representative of an automobile transmission in neutral gear.

As indicated above, the surfaces of the simulator board, the display board and at least the bases of the manipulative pieces are made from or contain a magnetically attractive material. The term magnetically attractive material is intended to encompass a material that is either itself magnetic or a material that is attracted to a magnet. Thus, where the surface of the boards is magnetic, the bases of the pieces need be only of a material that is attracted to a magnet. In the simpler and preferred embodiment, the bases of the pieces have laminated thereto a section of a magnetic material such as magnetic ferrite plastic or metal, and the boards are made of material that is attractive to a magnet such as galvanized steel.

All of the above materials are most conveniently supplied housed in a compartmentalized case for easy use and storage. Thus the educational kit includes the simulator board, the display board, the manipulative pieces, the visual slides or tapes and the audio cassette. The kit may also include student worksheets, sample tests or quizzes to be given by the instructor before and after use of the unit and an instructor's manual.

To illustrate how the educational kit is used, the audiovisual presentation begins with an introduction dealing with the power train subsystems of an automobile wherein the roles of the engine, clutch, transmission, drive shaft and differential are discussed. The presentation then focuses on the role of the clutch and how it works. Next the student is introduced to the concepts of mechanics, mechanical advantage, gear ratio and torque. This instructional material is presented to the student by means of the visual slides and the synchronized audio presentation. At certain points during the presentation the student is asked to switch to the simulator board and accessories and reconstruct an assembly of gears and shafts as depicted in a video segment of the presentation. For example, the student might be asked to position the pieces representing the main shaft and counter shaft within the confines of the transmission housing depicted on the simulator board as shown in a video diagram. After further discussion of, for example, the synchronizing clutch, second speed gear and sliding gear, he might then be asked to position these pieces at the appropriate locations. After additional instructional material concerning the assembly and relationship of the various gears, he might then be asked to manipulate the various gears or the clutch to represent the relative assembly of these parts when the transmission is in neutral, first, second, third or reverse gears. Each of these gear positions may be depicted by simply sliding back and forth certain gears represented by the manipulative pieces, and by adding or subtracting gears or other parts as per instruction. The student might then be requested to show the direction of rotation of a given gear or shaft using the arrow and then reconstruct the relationship of the other gears and shafts required to impart forward or reverse motion to the automobile. The simulator board and the accessory pieces thus permit the student to actually construct gear and shaft relationships which are being taught to him and thereby demonstrate his understanding of the assembly and relationship of the internal parts present in an automobile transmission.

The above described educational kit is programmed such that the student will encounter a minimum of frustration and a maximum of learning efficiency during the use of the kit. Upon completion of the kit, the learner should be able to define or describe in one sentence or less terms such as clutch, drive shaft, differential, rear axle, pressure plate, pressure springs, torque converter, universal joint, slip joint, ring gear, differential frame, differential pinion gear, and the like. He should be able to describe at least two functions of differential, the purpose and operation of a typical disc type clutch, the operation of a simplified differential assembly, and how a manual transmission functions. He should also be able to list the sequence of gear and internal clutch movements in shifting from neutral through first and second to third gear and from neutral to reverse. He should also be able to identify and describe the operation of each of the gears and shafts present in a manual transmission during various stages of operation.

The complete description of the educational kit encompassed by the present invention may be found in a booklet entitled: "Transmission, Drive Shaft and Axle Operation-Automotive Technology" (unit 10099-80) published as part of the Occupational Technology Series by the Xerox Corporation.

What I claim is:

1. An educational kit for teaching the assembly, relationship of parts, and operation of an automotive transmission system comprising:
    a. a simulator board having a surface of magnetically attractive material and including graphic indicia on the surface thereof as shown in FIG. 1 defining a schematic sectional diagram of an automobile transmission housing;
    b. a plurality of magnetically attractive manipulative pieces individually bearing on their surfaces graphic indicia as shown in FIG. 3, including indicia defining parts for an automobile transmission.
    c. a display board for said manipulative pieces including a sheet of magnetically attractive material, said display board having graphic indicia on a surface thereof in spaced relationship, said graphic indicia being identical with the indicia present on each of said manipulative pieces, said manipulative pieces adapted for storage on and removal from said display board; and
    d. audio-visual instructional means for presenting information relevant to an automotive transmission system, including information defining a logical relationship between the indicia on said pieces and the indicia on said board; said manipulative pieces adapted for manipulation on the simulator board and in association with the simulator board indicia by the user in response to said instructional means such that the assembly, relationship of parts, and operation of an automotive transmission system can be physically simulated; said magnetically attractive board or alternatively each of said magnetically attractive pieces being magnetic to provide a mutual attraction between said board and said pieces.

2. An educational kit according to claim 1 therefor wherein the manipulative pieces are magnetic.

3. An educational kit according to claim 1 therefor wherein the manipulative pieces are constructed of a flat sheet of a rigid material having smaller sections of a magnetic material laminated thereto.

4. An educational kit according to claim 1 therefor wherein said audio instructional means includes tape recordings which are synchronized with said visual instruction means which includes slides or film strips.

5. An educational kit according to claim 1 therefor wherein said instructional means includes a plurality of student work sheets, said work sheets being adapted for use by the student to record information and test the student in response to said audiovisual instructional means.

* * * * *